United States Patent
Nelson et al.

(10) Patent No.: US 9,922,651 B1
(45) Date of Patent: Mar. 20, 2018

(54) AVIONICS TEXT ENTRY, CURSOR CONTROL, AND DISPLAY FORMAT SELECTION VIA VOICE RECOGNITION

(71) Applicant: Rockwell Collins, Inc., Cedar Rapids, IA (US)

(72) Inventors: Brent J. Nelson, Marion, IA (US); David A. Gribble, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/458,838

(22) Filed: Aug. 13, 2014

(51) Int. Cl.
| | | |
|---|---|---|
| *G10L 21/00* | (2013.01) | |
| *G10L 25/00* | (2013.01) | |
| *G10L 15/00* | (2013.01) | |
| *G10L 15/26* | (2006.01) | |
| *G10L 15/06* | (2013.01) | |

(Continued)

(52) U.S. Cl.
CPC ............... *G10L 15/26* (2013.01); *G06F 3/017* (2013.01); *G06F 3/04842* (2013.01)

(58) Field of Classification Search
CPC .... G06F 3/04842; G06F 3/0481; G06F 3/016; G06F 3/036; G06F 3/0348; G06F 17/289; G06F 17/2785; G10L 15/22; G10L 15/265; G10L 15/063; G10L 15/005; G10L 15/30; G10L 15/187; G10L 15/08; H04M 1/271; H04M 1/72522; H04M 1/272519
See application file for complete search history.

(56) References Cited

U.S. PATENT DOCUMENTS

| | | | | |
|---|---|---|---|---|
| 4,725,956 A | | 2/1988 | Nagata | |
| 5,689,619 A | * | 11/1997 | Smyth | ................ G02B 27/0093 345/156 |

(Continued)

FOREIGN PATENT DOCUMENTS

WO    WO 2014057140 A3 * 6/2014 ............. G06F 3/167

OTHER PUBLICATIONS

Matt Thurber, Garmin G5000 Adds Vision to Learjet Cockpit, Aviation International News, Oct. 3, 2012, Printed online at: http://www.ainonline.com/aviation-news/aviation-international-news/2012-10-03/garmin-g5000-adds-vision-learjet-cockpit, 4 pages.

(Continued)

*Primary Examiner* — Anne L Thomas-Homescu
(74) *Attorney, Agent, or Firm* — Angel N. Gerdzhikov; Donna P. Suchy; Daniel M. Bariberi

(57) ABSTRACT

A method includes detecting an initiation command to begin outputting text data received from a voice recognition system to a text buffer of an aircraft. The method includes recognizing user speech as the text data and outputting the text data to the text buffer for presentation to a user. The method further includes detecting an end command to end outputting the text data received from the voice recognition system to the text buffer. The method also includes receiving a confirmation input from the user, the confirmation input indicating that the user has confirmed accuracy of the text data of the text buffer. The method additionally includes receiving a destination selection from the user, the destination selection indicating a destination selected by the user for the text data of the text buffer. The method further includes outputting the text data of the text buffer to the destination selected by the user.

12 Claims, 11 Drawing Sheets

(51) Int. Cl.
    *G10L 13/00*     (2006.01)
    *G10L 13/08*     (2013.01)
    *G10L 15/04*     (2013.01)
    *G10L 19/00*     (2013.01)
    *G06F 17/00*     (2006.01)
    *G06F 17/20*     (2006.01)
    *G06F 17/21*     (2006.01)
    *G06F 17/22*     (2006.01)
    *G06F 17/24*     (2006.01)
    *G06F 17/25*     (2006.01)
    *G06F 17/26*     (2006.01)
    *G06F 17/27*     (2006.01)
    *G06F 17/28*     (2006.01)
    *G06F 3/01*     (2006.01)
    *G06F 3/0484*     (2013.01)

(56) References Cited

U.S. PATENT DOCUMENTS

| | | | | |
|---|---|---|---|---|
| 5,751,260 A * | 5/1998 | Nappi | | G06F 3/013 340/4.13 |
| 5,818,423 A | 10/1998 | Pugliese et al. | | |
| 5,926,790 A | 7/1999 | Wright | | |
| 5,956,681 A * | 9/1999 | Yamakita | | H04M 1/72552 704/231 |
| 5,960,399 A * | 9/1999 | Barclay | | G10L 15/02 370/349 |
| 5,974,384 A | 10/1999 | Yasuda | | |
| 6,112,140 A * | 8/2000 | Hayes | | G05D 1/0077 244/195 |
| 6,173,192 B1 | 1/2001 | Clark | | |
| 6,643,580 B1* | 11/2003 | Naimer | | G01C 21/005 244/1 R |
| 6,842,122 B1* | 1/2005 | Langner | | G01C 23/005 340/945 |
| 7,089,108 B2 | 8/2006 | Merritt | | |
| 7,129,857 B1* | 10/2006 | Spirkovska | | G01W 1/00 340/971 |
| 7,200,555 B1* | 4/2007 | Ballard | | G10L 15/22 704/235 |
| 7,415,326 B2 | 8/2008 | Komer et al. | | |
| 7,606,715 B1 | 10/2009 | Krenz | | |
| 7,612,688 B1* | 11/2009 | Vigeant-Langlois | | G01C 23/00 340/539.28 |
| 7,809,405 B1 | 10/2010 | Rand et al. | | |
| 7,856,248 B1* | 12/2010 | Fujisaki | | H04M 1/575 455/414.1 |
| 7,881,493 B1* | 2/2011 | Edwards | | G06K 9/00597 348/78 |
| 7,881,832 B2 | 2/2011 | Komer et al. | | |
| 7,912,592 B2 | 3/2011 | Komer et al. | | |
| 8,139,025 B1 | 3/2012 | Krenz | | |
| 8,164,487 B1* | 4/2012 | Tsai | | G01C 23/00 340/574 |
| 8,220,038 B1* | 7/2012 | Lucchesi | | H04L 63/105 726/4 |
| 8,234,121 B1 | 7/2012 | Swearingen | | |
| 8,311,827 B2 | 11/2012 | Hernandez et al. | | |
| 8,515,763 B2 | 8/2013 | Dong et al. | | |
| 8,543,157 B1* | 9/2013 | Fujisaki | | H04M 1/64 379/142.1 |
| 8,793,139 B1* | 7/2014 | Serban | | G10L 15/22 704/275 |
| 8,880,243 B1* | 11/2014 | Duvall | | G01C 23/005 701/120 |
| 9,132,913 B1* | 9/2015 | Shapiro | | B64C 19/00 |
| 9,202,380 B1* | 12/2015 | Shapiro | | G08G 5/0082 |
| 9,619,020 B2* | 4/2017 | George-Svahn | | G06F 3/013 |
| 2002/0098800 A1* | 7/2002 | Frazita | | G08G 5/0091 455/12.1 |
| 2002/0143533 A1* | 10/2002 | Lucas | | G06F 3/167 704/235 |
| 2002/0198721 A1* | 12/2002 | Weiser | | G10L 15/01 704/275 |
| 2003/0110028 A1 | 6/2003 | Bush | | |
| 2003/0210280 A1* | 11/2003 | Baker | | G06F 3/0481 715/835 |
| 2003/0216861 A1* | 11/2003 | Sakata | | G01C 21/36 715/863 |
| 2004/0162727 A1* | 8/2004 | Kiuchi | | G10L 15/32 704/254 |
| 2005/0065779 A1* | 3/2005 | Odinak | | G10L 15/30 704/201 |
| 2005/0143134 A1* | 6/2005 | Harwood | | H04M 1/271 455/563 |
| 2005/0203676 A1* | 9/2005 | Sandell | | G08G 5/0052 701/3 |
| 2005/0203700 A1 | 9/2005 | Merritt | | |
| 2005/0203729 A1* | 9/2005 | Roth | | H04M 1/72563 704/5 |
| 2006/0037038 A1* | 2/2006 | Buck | | G06F 3/013 725/9 |
| 2006/0046715 A1* | 3/2006 | Burgemeister | | H04B 7/18506 455/431 |
| 2006/0080079 A1* | 4/2006 | Yamabana | | G06F 17/289 704/2 |
| 2006/0111890 A1* | 5/2006 | Mowatt | | G06F 3/16 704/3 |
| 2006/0218492 A1* | 9/2006 | Andrade | | G06F 17/24 715/234 |
| 2006/0256083 A1* | 11/2006 | Rosenberg | | G06F 3/013 345/156 |
| 2007/0043563 A1* | 2/2007 | Comerford | | G10L 15/28 704/243 |
| 2007/0050133 A1* | 3/2007 | Yoshikawa | | G01C 21/3658 701/437 |
| 2007/0073472 A1* | 3/2007 | Odinak | | G01C 21/3644 701/420 |
| 2007/0124694 A1* | 5/2007 | Van De Sluis | | G06F 3/017 715/775 |
| 2007/0189328 A1* | 8/2007 | Judd | | G10L 15/26 370/466 |
| 2007/0219805 A1* | 9/2007 | Nomura | | G10L 15/22 704/275 |
| 2007/0288242 A1 | 12/2007 | Spengler et al. | | |
| 2008/0045198 A1* | 2/2008 | Bhogal | | G08G 5/0013 455/414.4 |
| 2008/0065275 A1 | 3/2008 | Vizzini | | |
| 2008/0114541 A1* | 5/2008 | Shintani | | G01C 21/362 701/420 |
| 2008/0120106 A1* | 5/2008 | Izumida | | G10L 13/047 704/251 |
| 2008/0120665 A1* | 5/2008 | Relyea | | H04N 21/4147 725/110 |
| 2008/0147410 A1* | 6/2008 | Odinak | | G10L 15/26 704/270.1 |
| 2008/0167885 A1* | 7/2008 | Judd | | G08G 5/0013 701/120 |
| 2008/0195309 A1* | 8/2008 | Prinzel, III | | G01C 23/00 701/532 |
| 2008/0201148 A1* | 8/2008 | Desrochers | | 704/257 |
| 2008/0205283 A1* | 8/2008 | McGuffin | | H04B 7/18506 370/238 |
| 2008/0221886 A1* | 9/2008 | Colin | | G08G 5/0013 704/246 |
| 2009/0093953 A1* | 4/2009 | Wiesemann | | G01C 23/005 701/532 |
| 2009/0273487 A1* | 11/2009 | Ferro | | B64C 1/1469 340/963 |
| 2009/0302174 A1* | 12/2009 | Ausman | | B64D 45/0005 244/76 R |
| 2010/0027768 A1* | 2/2010 | Foskett | | H04B 7/18506 379/88.14 |
| 2010/0030400 A1 | 2/2010 | Komer et al. | | |
| 2011/0148772 A1* | 6/2011 | Oksman | | G06F 3/0486 345/173 |
| 2011/0160964 A1* | 6/2011 | Obradovich | | G06F 17/30315 701/41 |

(56) References Cited

U.S. PATENT DOCUMENTS

| | | | | |
|---|---|---|---|---|
| 2011/0210870 | A1* | 9/2011 | McGuffin | G08G 5/0013 340/945 |
| 2011/0282522 | A1* | 11/2011 | Prus | G08G 5/0013 701/4 |
| 2011/0288871 | A1* | 11/2011 | Suzuki | B60R 16/0373 704/275 |
| 2011/0301943 | A1* | 12/2011 | Patch | G10L 15/26 704/9 |
| 2012/0078447 | A1* | 3/2012 | McGuffin | G08G 5/0013 701/3 |
| 2012/0102422 | A1* | 4/2012 | Letsu-Dake | G08G 5/0013 715/772 |
| 2012/0257684 | A1* | 10/2012 | Vasek | G08G 5/0013 375/259 |
| 2013/0010934 | A1* | 1/2013 | Miller | H04M 3/533 379/88.01 |
| 2013/0029701 | A1* | 1/2013 | Cabos | H04B 7/18502 455/466 |
| 2013/0033387 | A1* | 2/2013 | Trope | G01C 23/00 340/971 |
| 2013/0204469 | A1* | 8/2013 | Horsager | B64D 45/00 701/3 |
| 2013/0307771 | A1* | 11/2013 | Parker | G06F 3/013 345/158 |
| 2013/0332160 | A1* | 12/2013 | Posa | G06F 3/013 704/235 |
| 2013/0346081 | A1* | 12/2013 | Loubiere | G08G 5/0013 704/260 |
| 2014/0088970 | A1* | 3/2014 | Kang | G06F 3/167 704/260 |
| 2014/0122070 | A1* | 5/2014 | Prus | G08G 5/0021 704/235 |
| 2014/0180698 | A1* | 6/2014 | Kai | G10L 15/22 704/275 |
| 2014/0195139 | A1* | 7/2014 | Smith | G08G 5/0013 701/120 |
| 2014/0237367 | A1* | 8/2014 | Jung | G06F 3/167 715/728 |
| 2014/0240313 | A1* | 8/2014 | Varga | G06T 19/006 345/419 |
| 2014/0304280 | A1* | 10/2014 | Oursbourn | G06F 17/30867 707/754 |
| 2014/0320417 | A1* | 10/2014 | Pakki | G06F 3/0238 345/172 |
| 2014/0372117 | A1* | 12/2014 | Nakata | G10L 15/26 704/235 |
| 2015/0007116 | A1* | 1/2015 | Visser | G06F 3/04842 715/856 |
| 2015/0019227 | A1* | 1/2015 | Anandarajah | G10L 15/22 704/257 |
| 2015/0081138 | A1* | 3/2015 | Lacko | B64D 45/00 701/3 |
| 2015/0097706 | A1* | 4/2015 | Perger | G01C 23/00 340/977 |
| 2015/0116197 | A1* | 4/2015 | Hamelink | G06F 3/013 345/156 |
| 2015/0130711 | A1* | 5/2015 | Lee | G02B 27/017 345/156 |
| 2015/0139441 | A1* | 5/2015 | Kawalkar | H04M 3/20 381/82 |
| 2015/0142428 | A1* | 5/2015 | Zhao | G10L 15/00 704/231 |
| 2015/0156803 | A1* | 6/2015 | Ballard | G02B 27/017 455/422.1 |
| 2015/0162001 | A1* | 6/2015 | Kar | G08G 5/0013 704/235 |
| 2015/0199906 | A1* | 7/2015 | Judy | G08G 5/003 701/3 |
| 2015/0213634 | A1* | 7/2015 | Karmarkar | G06T 11/60 345/589 |
| 2015/0217870 | A1* | 8/2015 | McCullough | G08G 5/0021 704/275 |
| 2015/0239574 | A1* | 8/2015 | Ball | B64D 45/00 701/3 |
| 2015/0261496 | A1* | 9/2015 | Faaborg | G06F 3/167 715/728 |
| 2015/0364044 | A1* | 12/2015 | Kashi | G08G 5/0095 701/120 |
| 2015/0375853 | A1* | 12/2015 | Kawalkar | B64C 25/405 244/50 |
| 2016/0034250 | A1* | 2/2016 | McCullough | G06F 3/017 704/275 |

OTHER PUBLICATIONS

B.K. Sidhu, Honeywell to redefine air travel experience, The Star Online, Published Jun. 7, 2014, Printed online at: http://www.thestar.com.my/Business/Business-News/2014/06/07/Honeywell-to-redefine-air-travel-experience/, 6 pages.
U.S. Appl. No. 13/248,814, filed Sep. 9, 2011, Barber.
U.S. Appl. No. 14/013,883, filed Aug. 29, 2013, Shapiro.
U.S. Appl. No. 14/038,249, filed May 26, 2013, Shapiro.
U.S. Appl. No. 14/038,406, filed Sep. 26, 2013, Shapiro.
U.S. Appl. No. 14/038,439, filed Sep. 26, 2013, Shapiro.

* cited by examiner

AVIONICS TEXT ENTRY, CURSOR CONTROL, AND DISPLAY FORMAT SELECTION VIA VOICE RECOGNITION

CROSS-REFERENCE TO RELATED APPLICATIONS

The present application is related to U.S. patent application Ser. No. 13/248,814, filed on Sep. 29, 2011; the present application is related to U.S. patent application Ser. No. 14/013,883, filed on Aug. 29, 2013; the present application is related to U.S. patent application Ser. No. 14/038,249, filed on Sep. 26, 2013.

U.S. patent application Ser. Nos. 13/248,814, 14/013,883, and 14/038,249 are herein incorporated by reference in their entirety.

FIELD OF THE INVENTION

Embodiments of the invention are directed generally toward a method, apparatus, and system for utilizing voice recognition for text entry, cursor control, and display format selection in aircraft systems.

BACKGROUND

Current text entry in cockpit requires a pilot to use physical controls, such as a multifunction keypad (MKP) or cursor control panel (CCP), typically located on a pedestal. Entering text into the MKP or CCP requires pilots to shift their eyes down to the MKP or CCP. Looking down to enter text takes a pilot's focus away from other important pilot tasks.

Additionally, current avionics systems use quick access keys (QAKs) for pilots to select display formats (such as flight management system (FMS), chart, and map) by pressing buttons on an MKP. QAKs require head-down operation, which may distract a pilot from other flying tasks. The head-down operation distractions may be especially problematic in single pilot aircraft. For example, in current single pilot aircraft, format selection is required more often in a single pilot three display system where only two displays are typically used. Additionally, for example, workload due to format selection feels higher because it is a "blocking" task; that is, a format must be selected before a task can be started. Further, errors in format selection often cause the system to remove desired information from the display, which creates additional workload to correct.

Further, existing cursor control devices require pilots to use a hand movement to position a cursor. Typically, to perform cursor control operations, pilots would be required to user their hands to operate a cursor control device to manipulate a cursor from one point, selectable object, or interactive control on the display to another point, selectable object, or interactive control on the display; however, interfacing with a cursor control device requires the pilot to perform head-down tasks that detract from a pilot's ability to focus on important head-up tasks. Additionally, currently avionics systems are required to have primary and back up cursor control devices for each pilot in case of failure of a cursor control device. Currently, there is no means for controlling where text data is to be entered on the flight deck without using a cursor control device, a touchscreen, or an MKP.

Therefore, it would be desirable to provide a method, apparatus, and system which provide solutions to the aforementioned existing problems.

SUMMARY

In one aspect, embodiments of the inventive concepts disclosed herein are directed to a method. The method includes detecting an initiation command to begin outputting text data received from a voice recognition system to a text buffer of an aircraft. The method includes recognizing user speech as the text data and outputting the text data to the text buffer for presentation to a user. The method further includes detecting an end command to end outputting the text data received from the voice recognition system to the text buffer. The method also includes receiving a confirmation input from the user, the confirmation input indicating that the user has confirmed accuracy of the text data of the text buffer. The method additionally includes receiving a destination selection from the user, the destination selection indicating a destination selected by the user for the text data of the text buffer. The method further includes outputting the text data of the text buffer to the destination selected by the user.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Figure 1:
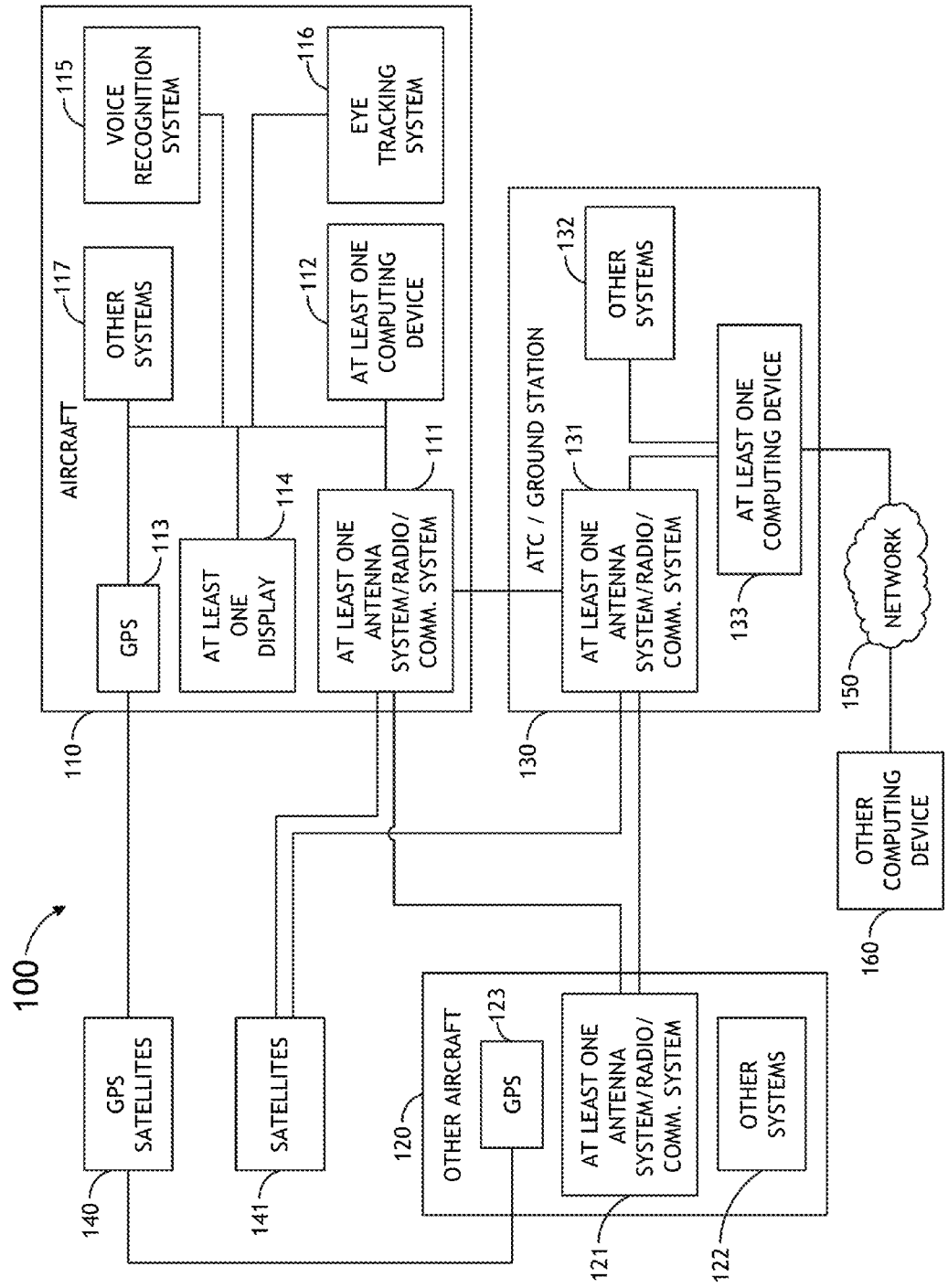
FIG. 1 shows an exemplary system topology of some embodiments of the invention.

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention are configured to utilize a voice recognition system to enter text input data to a text buffer (e.g., a scratchpad). For example, a user (e.g., a pilot or aircraft crew member) may speak into a voice recognition system. The voice recognition system may recognize the speech of the user and output text data to a text buffer, which may be implemented as a portion of a display, a display portion of a keypad, or the like. The text buffer may present the text data received from the voice recognition system as text to the user. In some embodiments, the text may include a command. The user may review the text displayed on the text buffer, for example, for accuracy. If the user verifies the text, the user may select a destination for the verified text by interfacing with an input device, such as a cursor control device (e.g., a mouse, a touch pad, or the like), a touchscreen, a key of a keypad, a voice recognition system, an eye tracking system, or the like. The destination may include a destination device, a destination system, a destination field of a graphical user interface (GUI) presented on a display, or the like. Upon the selection of the destination by the user, the text buffer (or a device on which the text buffer is implemented) may output the text to the selected destination.

Some embodiments of the invention are configured to utilize a voice recognition system to control the location of an indicator (e.g., a cursor, a pointer, or the like) of a GUI of an aircraft display or to select a selectable object of a GUI of an aircraft display. Such embodiments of the invention may be configured to control the selection of a selectable object (e.g., a field, a tab, an icon, a button, a region, a window, or the like) of a GUI for data entry or may be configured to control (e.g., move, select, move while selected (e.g., highlight), unselect, enter, click, or the like) an indicator (e.g., a cursor, a pointer, or the like) of a GUI.

Additionally, some embodiments of the invention are configured to utilize a voice recognition system to select a display format (e.g., a window format such as a size or location of a window, content to be displayed in a window, or the like) of a GUI of one or more selected aircraft displays or to target a portion (e.g., a window) of a GUI of one or more aircraft displays to present a particular type of content (e.g., flight management system (FMS) content, map content, chart content, flight checklist content, system content, or the like). For example, a user may select window formats by performing a simple voice command which is recognized by the voice recognition system.

Referring now to FIG. 1, an overall system diagram of exemplary embodiments is depicted. The exemplary system 100 includes an aircraft 110, an air traffic control station or ground station 130, and global positioning system (GPS) satellites 140. Some embodiments further include at least one other aircraft 120, satellites 141, at least one network 150, and at least one other computing device 160.

In some embodiments, the aircraft 110 includes at least one antenna system, radio, and/or communication system 111, at least one computing device 112, a global positioning system (GPS) device 113, at least one display 114, a voice recognition system 115, an eye tracking system 116, as well as other systems 117, equipment, and devices commonly included in aircraft. In some embodiments, some or all of the at least one antenna system, radio, and/or communication system 111, the at least one computing device 112, the global positioning system (GPS) device 113, the at least one display 114, the voice recognition system 115, the eye tracking system 116 and/or the other systems 117 are communicatively coupled.

In exemplary embodiments, the at least one antenna system, radio, and/or communication system 111 may be configured to send and/or receive signal, data, and/or voice transmissions to and/or from other aircraft 120, an air traffic control station or ground station 130, satellites 141, or combinations thereof. For example, the at least one antenna system, radio, and/or communication system 111 may include a transceiver. An exemplary suitable transceiver may include a radiofrequency signal emitter and receiver; such exemplary transceiver may be configured to transmit or broadcast signals to other aircraft (e.g., the other aircraft 120), air traffic control/ground stations 130, or the like. In exemplary embodiment, the transceiver may be implemented as a universal access transceiver (UAT) configured to send and receive automatic dependent surveillance-broadcast (ADS-B) signals. Additionally, in some embodiments, the at least one antenna system, radio, and/or communication system 111 includes a communication radio configured to send and receive voice communications to/from other aircraft 120, air traffic control/ground stations 130, or combinations thereof.

In some embodiments, the GPS device 113 receives location data from the GPS satellites 40 and may provide the location data to any of various equipment/systems of the aircraft 110 (e.g. at least one antenna system, radio, and/or communication system 111, the at least one computing device 112, the at least one display 114, and/or any of the other systems 117 of the aircraft 110). For example, the GPS device 113 may receive or calculate location data from a sufficient number (e.g., at least four) of GPS satellites 140 in view of the aircraft 110 such that a GPS solution may be calculated.

In some embodiments, the at least one display includes one or more displays, projectors (such as an image projector, a retina projector, or the like), liquid crystal cells, and/or light emitting diodes (LEDs). Exemplary display devices may include a weather display overlay, a head-up display (HUD), a head-down display, a head-mounted display (HMD), an integrated display system, and/or the like. In some embodiments, the at least one display 114 includes a touchscreen display. In some embodiments, the at least one display 114 includes one or more components of a flight control panel.

In some embodiments, the other systems 117 of the aircraft 110 include a flight management system, a weather radar system, an auto-flight system, a traffic collision avoidance system (TCAS), a radio tuner, an altimeter (e.g., a radio altimeter), and/or the like.

In some embodiments, the other aircraft 120 includes at least one antenna system, radio, and/or communication system 121, a GPS device 123, as well as other systems 122, equipment, and devices commonly included in aircraft, as similarly described with reference to the aircraft 110, described above.

In some embodiments, the air traffic control or ground station 130 includes at least one antenna system, radio, and/or communication system 131, at least one (e.g., one, two, three, . . . one-hundred, or more) computing device 133, as well as other systems 132, equipment, and devices commonly included in an air traffic control or ground station 130. Each of the at least one antenna system, radio, and/or communication system 131 may be configured to receive and/or transmit signals from and/or to aircraft (e.g., aircraft 110, other aircraft 120). Additionally, one or more of the at least one computing device 133 may be communicatively coupled to an input device (e.g., mouse, keyboard, microphone, or the like), an output device (e.g., a display, speaker, or the like), or an input/output device (e.g., a touch-screen display, or the like) configured to interface with a user. For example, a particular computing device may be configured to output data to an output device for presentation to a user, and the particular computing device may be further coupled to an input device configured to receive input data from a user. In some embodiments, some or all of a plurality of computing devices (e.g., 133) are communicatively coupled to each other. In further embodiments, one or more of the at least one computing device 133 is communicatively connected to at least one other computing device 160 via one or more networks 150 (e.g., internet, intranet, or the like). For example, the other computing device 160 may comprise a computing device at a different air traffic control station or a different ground station.

Figure 2:
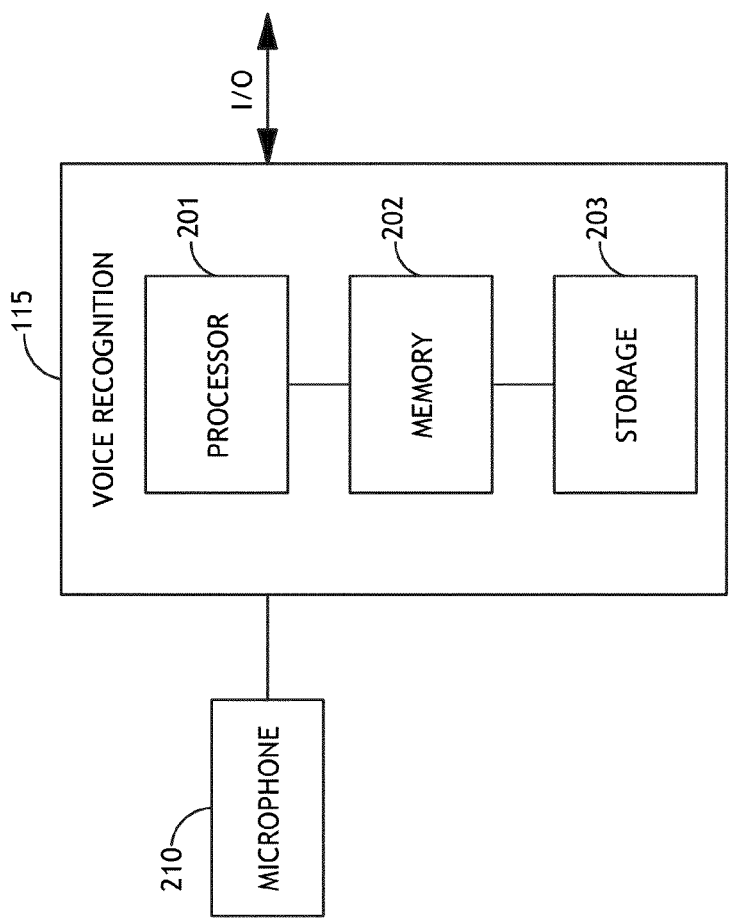
FIG. 2 depicts an exemplary voice recognition system coupled to a microphone of some embodiments.

Referring now to FIG. 2, an exemplary voice recognition system 115 of an aircraft 110 coupled to a microphone 210 is shown. In some embodiments, the voice recognition system 115 is configured to recognize voice commands or audible inputs of a user. In some embodiments, the voice recognition system 115 includes at least one (e.g., one, two, or more) processor 201, memory 202, and storage 203, as well as other components, equipment, and/or devices commonly included in a voice recognition system 115. The at least one processor 201, the memory 202, the storage 203, the microphone 210, as well as the other components, equipment, and/or devices commonly included in a voice recognition system 115 may be communicatively coupled. In some embodiments, the voice recognition system 115 is coupled to the microphone 210 and/or includes a dedicated microphone.

Figure 4:
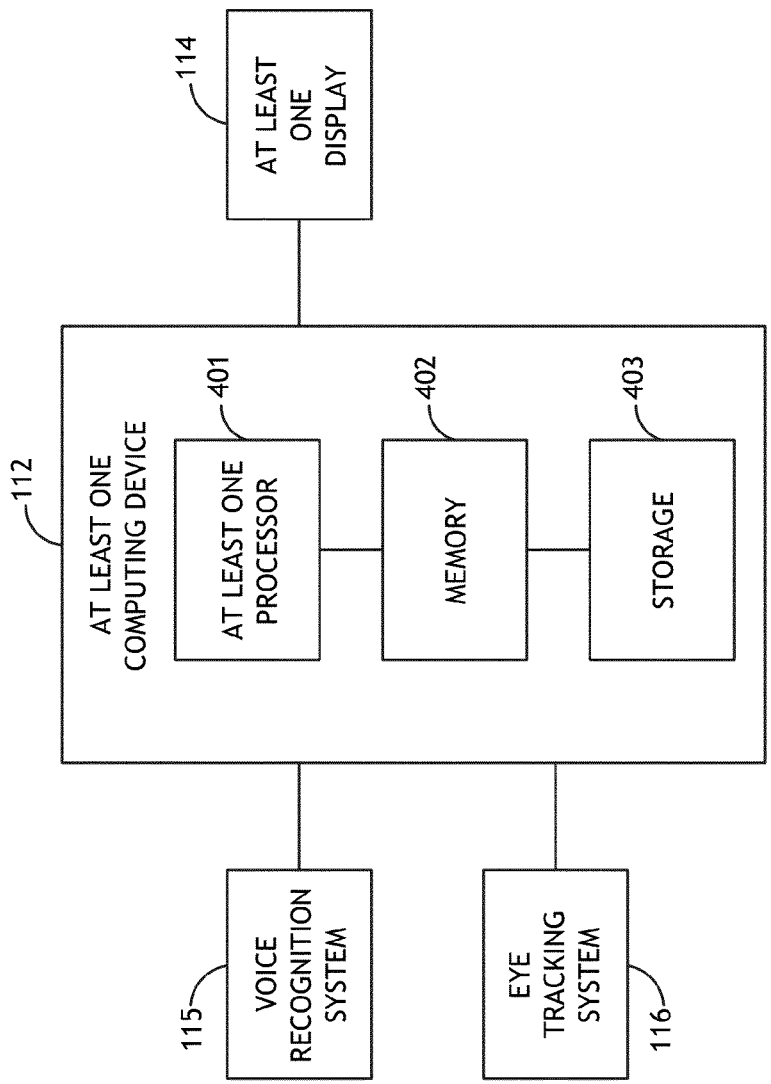
FIG. 4 depicts an exemplary computing device coupled to a voice recognition system, an eye tracking system, and a display of some embodiments.

The processor 201 may be configured to process data received from the microphone 210 and output processed data (e.g., text data) to one or more output devices (e.g., the at least one computing device 112, the at least one display 114, or the like) and/or output the processed data to another system of the aircraft 110. For example, the processor 201 may be configured to output processed data (e.g., text data) to the at least one antenna system, radio, and/or communication system 111 so that the processed data may be sent to other aircraft 120, an air traffic control station or ground station 130, satellites 141, or combinations thereof. Similarly, the processor 201 of the voice recognition system 115 may be configured to provide processed data (e.g., text data) to at least one computing device 112 of the aircraft 110, as shown in FIG. 4. Exemplary embodiments may include the voice recognition system 115 being configured for performing fully automatic voice recognition operations of users in real time.

As shown in FIG. 2, the at least one processor 201 of the voice recognition system 115 may be configured to run various software applications or computer code stored in a non-transitory computer-readable medium and configured to execute various instructions or operations.

Figure 3:
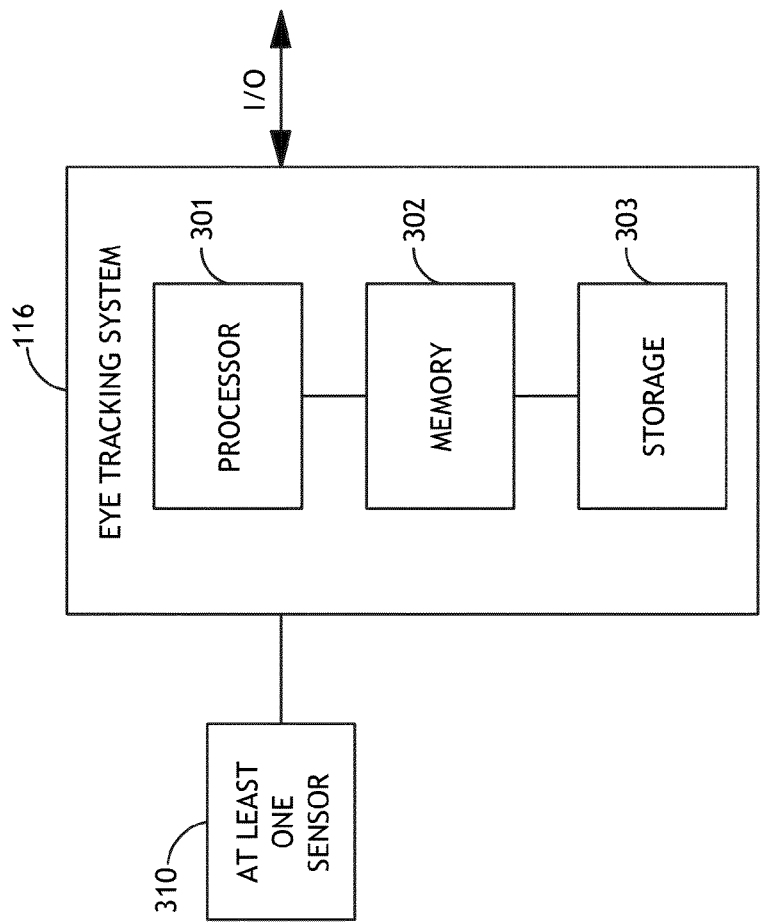
FIG. 3 depicts an exemplary eye tracking system coupled to a sensor of some embodiments.

Referring now to FIG. 3, an exemplary eye tracking system 116 of an aircraft 110 coupled to at least one sensor 310 is shown. In some embodiments, the eye tracking system 116 is configured to track eye gestures, movement of a user's eye, a user's gaze, or otherwise receive inputs from a user's eye. In some embodiments, the eye tracking system 116 includes at least one (e.g., one, two, or more) processor 301, memory 302, and storage 303, as well as other components, equipment, and/or devices commonly included in an eye tracking system 116. The at least one processor 301, the memory 302, the storage 303, the at least one sensor 310, as well as the other components, equipment, and/or devices commonly included in an eye tracking system 116 may be communicatively coupled. In some embodiments, the eye tracking system 116 is coupled to the at least one sensor 310 and/or includes one or more dedicated sensors. In some embodiments, the at least one sensor 310 comprises at least one camera.

The processor 301 may be configured to process data received from the at least one sensor 310 and output processed data to one or more output devices (e.g., the at least one computing device 112, the at least one display 114, or the like) and/or output the processed data to another system of the aircraft 110. For example, the processor 301 may be configured to output processed data to the at least one antenna system, radio, and/or communication system 111 so that the processed data may be sent to other aircraft 120, an air traffic control station or ground station 130, satellites 141, or the like. Similarly, the processor 301 of the eye tracking system 116 may be configured to provide data to at least one computing device 112 of the aircraft 110, as shown in FIG. 4. Exemplary embodiments of the invention include the eye tracking system 116 being configured for performing fully automatic eye tracking operations of users in real time.

As shown in FIG. 3, the at least one processor 301 of the eye tracking system 116 may be configured to run various software applications or computer code stored in a non-transitory computer-readable medium and configured to execute various instructions or operations.

Referring now to FIG. 4, an exemplary at least one computing device 112 of an aircraft 110 coupled to a voice recognition system 115, an eye tracking system 116, and at least one display 114 is shown. In some embodiments, the at least one computing device 112 includes at least one (e.g., one, two, or more) processor 401, memory 402, and storage 403, as well as other components, equipment, and/or devices commonly included in a computing device. The at least one processor 301, the memory 302, the storage 303, as well as the other components, equipment, and/or devices commonly included in a computing device may be communicatively coupled. In some embodiments, the at least one computing device 112 is coupled to the voice recognition system 115, the eye tracking system 116, and the at least one display 114. In other embodiments, the at least one computing device 112 includes one or more of the voice recognition system 115, the eye tracking system 116, and the at least one display 114.

The processor 401 may be configured to process data received from the voice recognition system 115 and/or the eye tracking system 116 and output processed data to one or more output devices (e.g., the at least one display 114, or the like) and/or output the processed data to another system of the aircraft 110. For example, the processor 401 may be configured to output processed data to the at least one antenna system, radio, and/or communication system 111 so that the processed data may be sent to other aircraft 120, an air traffic control station or ground station 130, satellites 141, or the like.

Additionally, one or more of the at least one computing device 112 may be communicatively coupled to one or more input devices (e.g., mouse, pointing device, joystick, keyboard, microphone, sensor, camera, electroencephalograph (EEG) sensors, or the like), an output device (e.g., a display, speaker, or the like), or an input/output device (e.g., a touch-screen display, or the like) configured to interface with a user (e.g., a pilot). For example, a particular computing device 112 may be configured to output data to an output device (e.g., the at least one display 114) for presentation to a user, and the particular computing device 112 may be further coupled to an input device configured to receive input data from a user.

As shown in FIG. 4, the at least one processor 401 of the at least one computing device 112 may be configured to run various software applications or computer code stored in a non-transitory computer-readable medium and configured to execute various instructions or operations.

Figure 5:
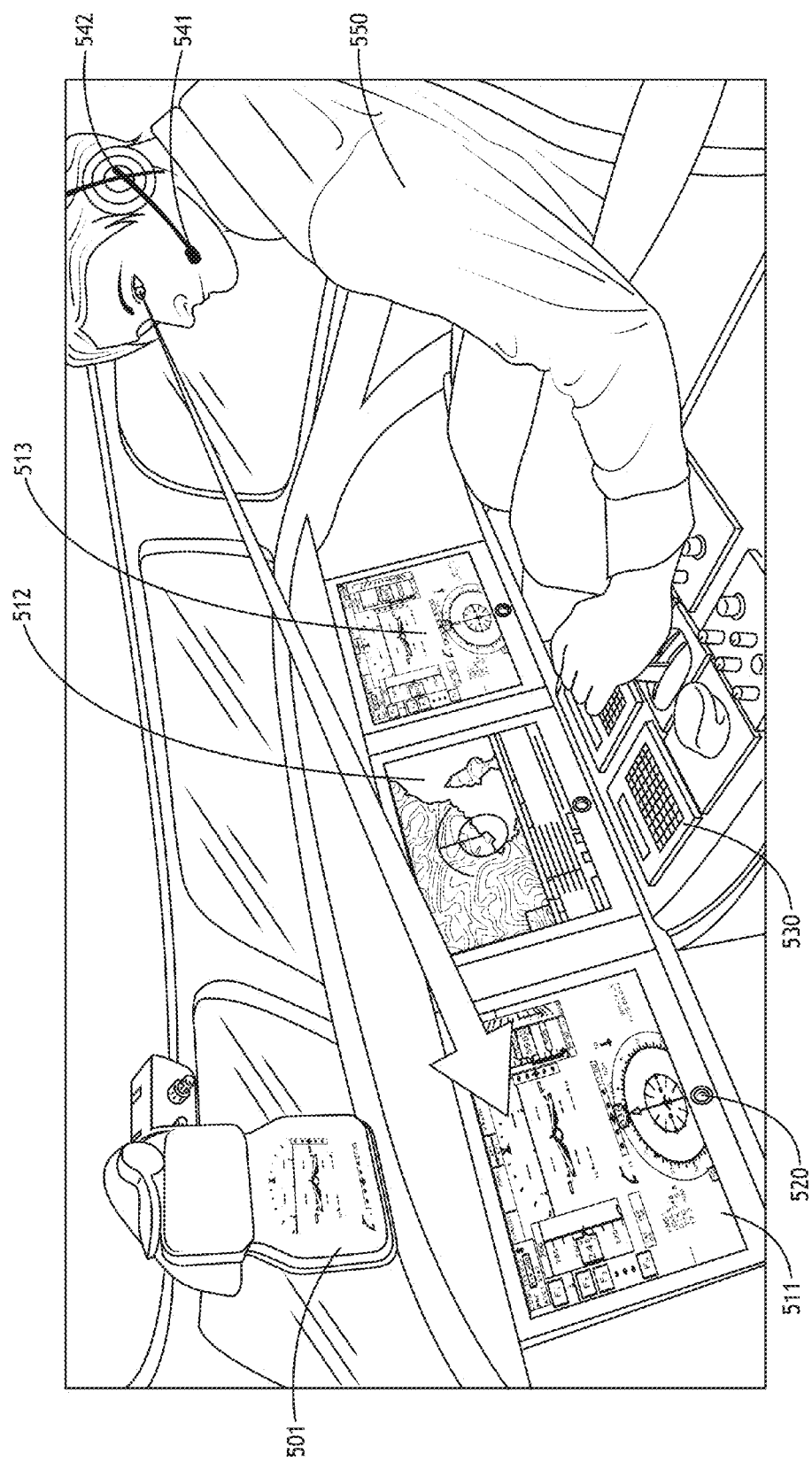
FIG. 5 depicts an exemplary partial view of a cockpit of an aircraft of some embodiments.

Referring now to FIG. 5, a partial view of a cockpit of the aircraft 110 of an exemplary embodiment of the invention is depicted. In some embodiments, a user 550 (e.g., a pilot, a copilot, a navigator, or the like) can interface with various components of the cockpit. In some embodiments, the cockpit includes at least one display 114 (such as a HUD 501, a first display 511, a second display 512, a third display 513, and/or the like), at least one sensor 310 (such as one or more cameras 520, or the like), a key pad 530 (such as an MKP, a keyboard, and/or the like), a microphone 210 (such as a headset microphone 541, or the like), and a speaker (such as a head set speaker 542, or the like) as well as other components, equipment, and/or devices commonly included a cockpit. In some embodiments, one or more of the at least one display 114, the at least one sensor 310, the key pad 530, the microphone 210, and the speaker (such as a head set speaker 542, or the like) as well as the other components, equipment, and/or devices commonly included a cockpit may be implemented as part of and/or communicatively coupled to one or more of the at least one antenna system, radio, and/or communication system 111, the at least one computing device 112, the global positioning system (GPS) device 113, the at least one display 114, the voice recognition system 115, the eye tracking system 116, as well as other systems 117, equipment, and devices commonly included in aircraft 110.

Figure 6:
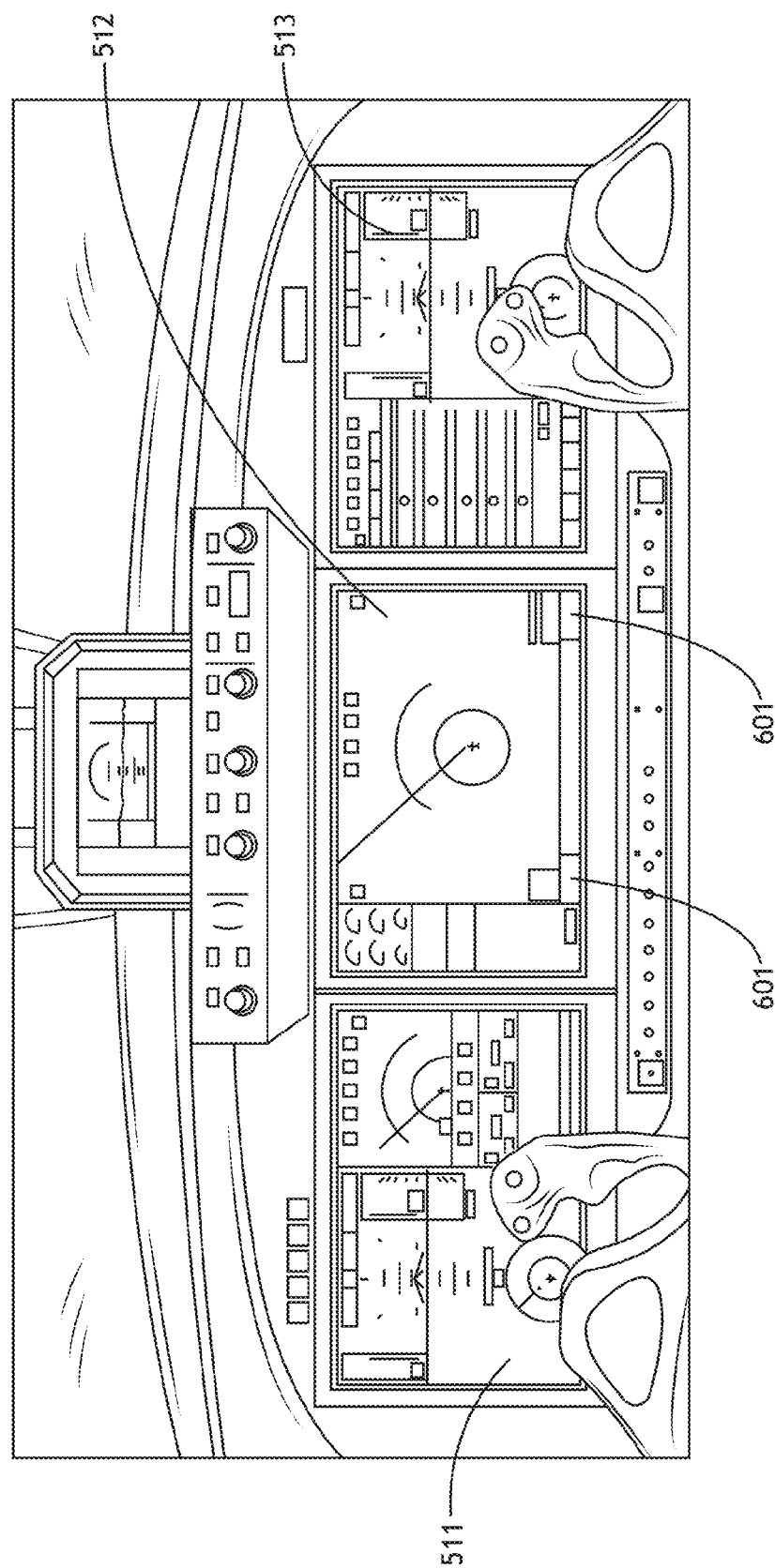
FIG. 6 depicts a further exemplary partial view of a cockpit of an aircraft of some embodiments.

Referring now to FIG. 6, a partial view of a cockpit of the aircraft 110 of a further exemplary embodiment of the invention is depicted. In some embodiments, one or more of the at least one displays 114 (such as a first display 511, a second display 512, a third display 513, and/or the like) includes one or more text buffers 601. In some embodiments, the one or more text buffers 601 may include or may be implemented as one or more "scratchpads" configured to temporarily store and display textual contents.

Figure 7:
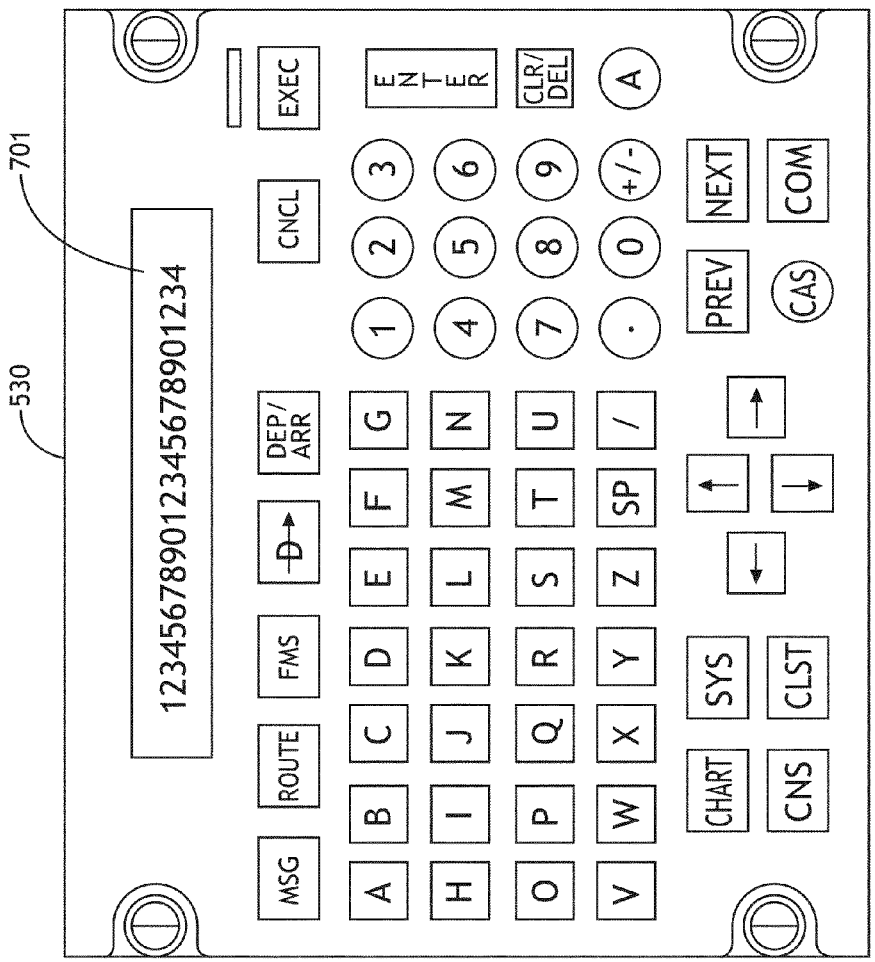
FIG. 7 depicts an exemplary keypad of some embodiments.

Referring now to FIG. 7, an exemplary keypad 530 of some embodiments is shown. The keypad 530 may comprise an MKP, a CCP, or the like. The keypad 530 may include at least one text buffer 701. In some embodiments, the at least one text buffer 701 may include or may be implemented as one or more "scratchpads" configured to temporarily store and display textual contents.

Figure 8:
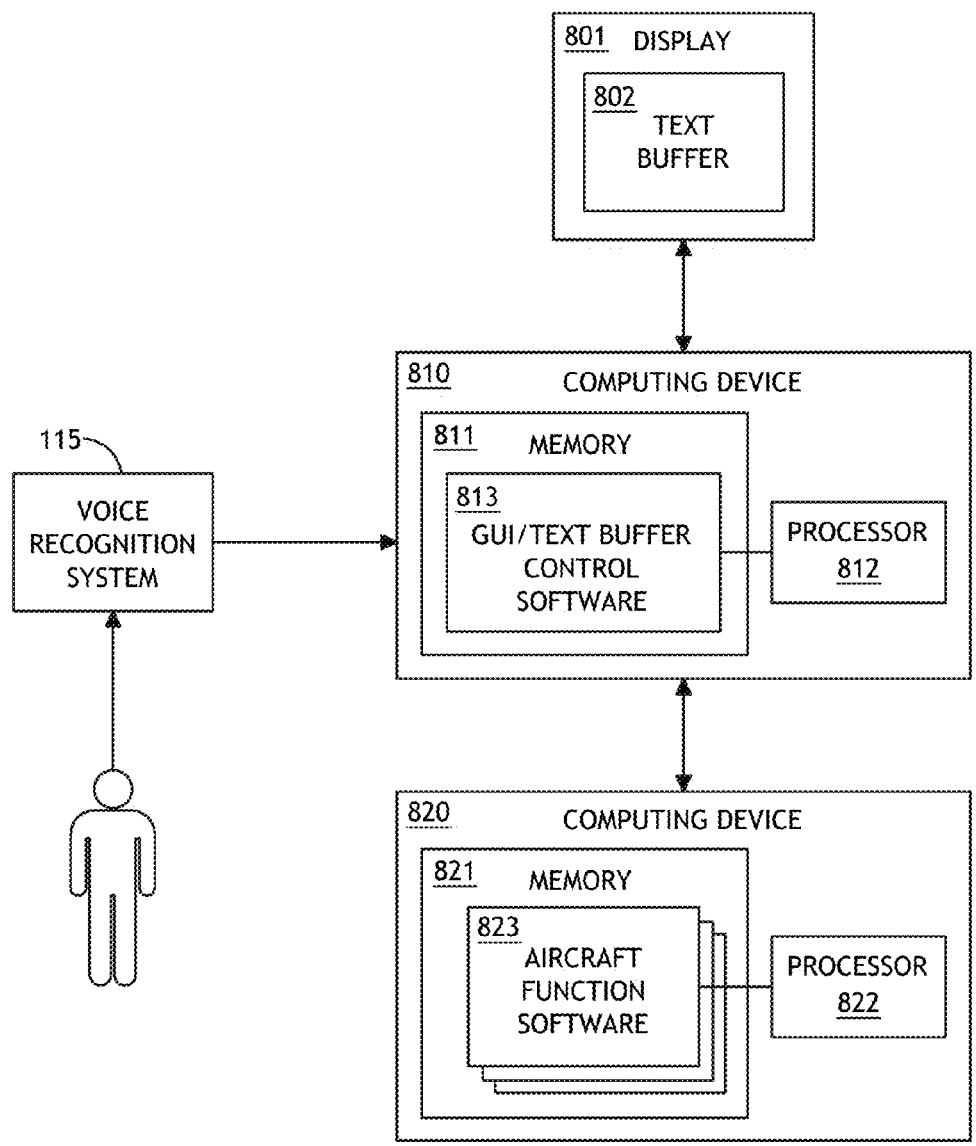
FIG. 8 depicts an exemplary system diagram of some embodiments.

Referring now to FIG. 8, an exemplary system diagram of some embodiments is shown. In an exemplary embodiment, an aircraft includes a voice recognition system 115, at least one display 801, a first computing device 810, and a second computing device 820, which are communicatively coupled with one another and with the display 801. In some embodiments, the at least one display 801 includes a text buffer 802 (e.g., text buffer 601 of display 512); in other embodiments, the text buffer 802 may be implemented as a dedicated display or implemented as a display of another device (e.g., text buffer 701 implemented on a keypad 530).

The first computing device 810 may include GUI/text buffer control software 813 stored in a non-transitory processor-readable medium (e.g., memory 811) and a processor 812. The processor 812 may be configured to execute instructions of the GUI/text buffer control software 813 to perform various operations. The processor 812 may be configured to receive text data from the voice recognition system 115. The processor 812 may further be configured to manage the contents of a text buffer 802 (e.g., a scratchpad). The processor 812 may further be configured to update the content of the text buffer 802 based on the received text data from the voice recognition system 115. The processor 812 may be configured to receive user verification of the contents of the text buffer 802 and to receive a command from the user with instructions of where (e.g., a destination) to output the contents of the text buffer 802. Additionally, the processor 812 may be configured to output the contents of the text buffer 802 to a selected portion of a particular display of the at least one display 801. The processor 812 may also receive a command (e.g., a voice command, an eye tracking command, a command from another input device, or the like) to output the contents of the text buffer 802 to computing device 820, which contains processor 822 configured to execute instructions of aircraft function software 823. Further, in some embodiments, where the eye tracking system contributes to selecting a destination, a computing device is configured to output (e.g., overlay on the GUI of a display) on the display a current location detected by the eye tracking system 116 of a pilot's gaze so that the pilot may compensate for any offset between the eye tracking system's 116 detected gaze location and the pilot's actual focus point and/or so that the pilot may confirm the eye tracking system's 116 detected gaze location. For example, such a command may be generated upon a user selecting a particular text input box on the display 801 through operation of a cursor control device, touchscreen, voice recognition system 115, eye tracking system 116, keypad 530, or other input device. The GUI/text buffer control software 813 may comprise one or more software applications or computer code stored in a non-transitory computer-readable medium 811 configured for performing various instructions or operations when executed by processor 812.

The second computing device 820 may include one or more aircraft function software 823 stored in a non-transitory processor-readable medium (e.g., memory 821) and a processor 822. The processor 822 may be configured to execute instructions of the one or more aircraft function software 823 to perform various operations. The processor 822 may be configured to perform any of various operations associated with an aircraft, a particular system of the aircraft, or the like. For example, in some embodiments, the processor 822 is configured to execute instructions of software configured to perform operations associated with a flight management system (FMS), a weather radar system, an attitude and heading reference system (AHRS), a traffic collision avoidance system (TCAS), radio tuning, or the like. For example, if the processor 822 receives the contents of the text buffer 802, the processor 822 may utilize the contents of the text buffer 802 to perform one or more aircraft function operations and then a) output data or modified text content back to the processor 812 configured to execute the GUI/text buffer control software 813, b) output data directly to the display 801 for presentation on the display 801, c) output data to memory 822 for use by the processor 822 in executing instructions of another aircraft function software 823, d) output data to another system, or the like.

The one or more aircraft function software 823 may comprise one or more software applications or computer code stored in a non-transitory computer-readable medium (e.g., memory 822) configured for performing various instructions or operations when executed by processor 822.

While the GUI/text buffer software 813 and the aircraft performance software 823 are exemplarily depicted in FIG. 8 as running on separate computing devices, it is fully contemplated that the GUI/text buffer software 813 and the aircraft performance software 823 may be configured to run on a single computing device (e.g, computing device 810 or 820) or any number of computing devices in some embodiments.

Likewise, in some embodiments, the voice recognition system 115, the GUI/text buffer software 813, and the aircraft performance software 823 may be configured to run on a single computing device (e.g., computing device 810 or 820) or any number of computing devices. Additionally, while the GUI/text buffer software 813 and the aircraft performance software 823 are exemplarily depicted as separate software, the GUI/text buffer software 813 and the aircraft performance software 823 may be implemented as a single software module or program or any number of software modules or programs.

The voice recognition system 115 may be configured to process user speech in real time. The voice recognition system 115 may be configured to recognize individual characters (e.g., alphanumeric characters, non-alphanumeric characters, ascii characters, Unicode characters, or the like), strings (e.g., two or more characters, such as words or numbers), and/or phrases of strings. For example, the voice recognition system 115 may be configured to recognize pilot phonetic alphabet voice inputs (e.g., "alpha", "bravo", "charlie", etc.) as individual characters, and/or the voice recognition system 115 may be configured to recognize whole words or phrases. In some embodiments, the computing device 810 or 820 and/or the voice recognition system 115 may be configured to begin outputting recognized text data to the text buffer (e.g., 601, 701, or 802) upon recognition of an initiation command (such as recognition of a beginning keyword (e.g., "text" or the like), pressing an initiation button or icon, an eye tracking command, or the like) and end outputting recognized text data to the text buffer (e.g., 601, 701, or 802) upon recognition of an end command (e.g., such as recognition of an end keyword (e.g., "enter", "end", or the like), pressing an end button or icon, an eye tracking command, or the like). For example, a user's spoken phrase of "text one two one point three end" would output recognized text data of "121.3" to the text buffer (e.g., 601, 701, or 802). Additionally, in some embodiments, the computing device 810 or 820 and/or the voice recognition system 115 may be configured to recognize various control keywords (e.g., "clear", "delete", "change", or the like) for editing the contents of the text buffer (e.g., 601, 701, or 802). For example, recognition of the control keyword of "clear" may be configured to clear the contents of the text buffer, recognition of the control keyword of "delete" may be configured to delete the last string or character of the text buffer (e.g., 601, 701, or 802) contents, and recognition of the control keyword of "change" may be configured to change a particular string or character in the contents of the text buffer (e.g., 601, 701, or 802) to another string or character. Additionally, the computing device 810 or 820 and/or the voice recognition system 115 may be configured to recognize copy and/or paste commands. Recognition of a copy command (e.g., "copy to" "[destination]") may be configured to cause the contents of the text buffer (e.g., 601, 701, or 802) to fill a destination portion (e.g., a destination field) of the display 801. Additionally, for example, the contents of a first text buffer (e.g., text buffer 802) may be copied to the contents of a second text buffer (e.g., text buffer 601 or 701). Recognition of a paste command (e.g., "paste from" "[source]") may be configured to cause the contents of the text buffer (e.g., 601, 701, or 802) to be filled with the contents of a source portion (e.g., a source field) of the display 801. Further, the computing device 810 or 820 and/or the voice recognition system 115 may be configured to recognize routing commands configured to send the contents of the text buffer (e.g., 601, 701, or 802) to another on-board or off-board system, one or more aircraft function software 823, or the like. Also, the computing device 810 or 820 may be configured to fill the contents of a text buffer (e.g., 601, 701, or 802) received from multiple text input sources, such as text inputs received from a voice recognition system 115 and text inputs from a keypad 530.

Figure 9:
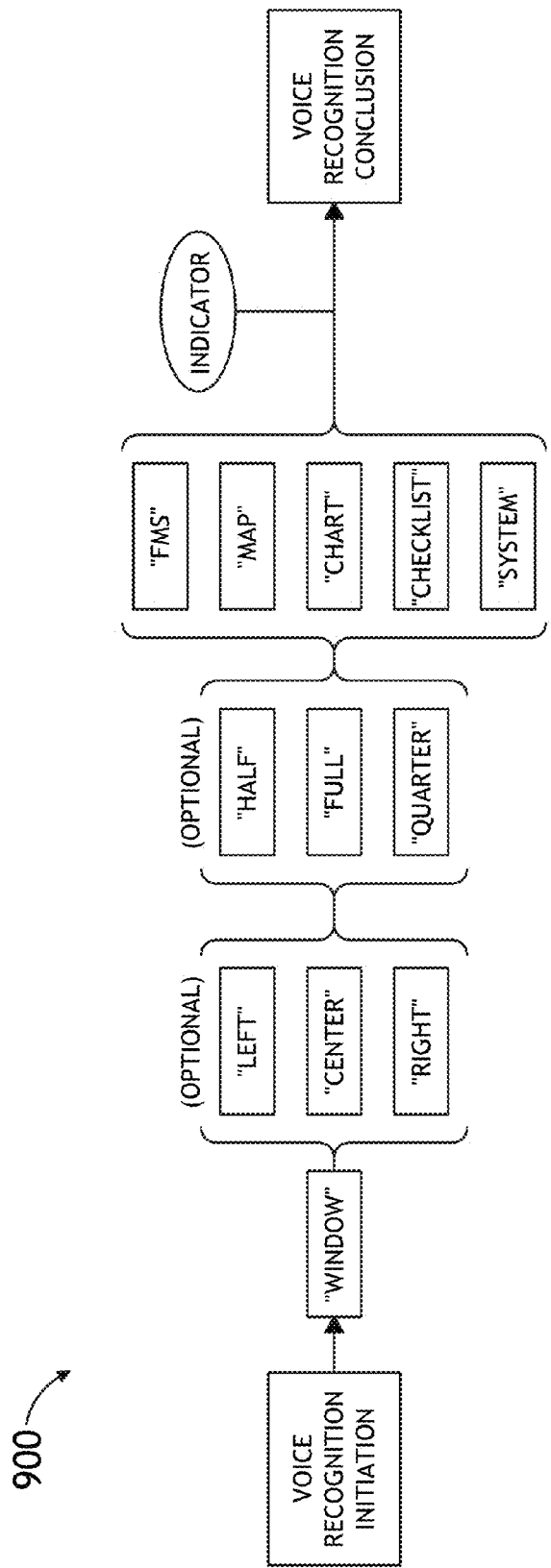
FIG. 9 depicts an exemplary flow diagram of an exemplary voice recognition sequence for selecting a display format of some embodiments.

Referring now to FIG. 9, an exemplary flow diagram of an exemplary voice recognition sequence 900 for selecting a display format (e.g., a window format (such as a size or location of a window, content (e.g., flight management system (FMS) content, map content, chart content, flight checklist content, system content, or the like) to be displayed in a window, or the like)) of a GUI of one or more selected aircraft displays. The voice recognition sequence 900 for selecting a display format may reduce the pilot's time spent performing head-down tasks as would typically be required by interfacing with a keypad. Additionally, in some embodiments, the voice recognition sequence 900 is configured to be received and handled by a processor executing existing display window manager software of an integrated display system, which is currently configured to receive quick access key inputs of the keypad for selecting a display format. Some embodiments of the invention may include configuring the processor, which executes the display window manager software, of the integrated display system to receive and handle the voice recognition sequence 900 for selecting a display format. Further, in some embodiments, selecting a display format may include a pilot using a combination of a voice recognition sequence 900 and physical inputs (e.g., quick access keys).

As shown in FIG. 9, the exemplary voice recognition sequence 900 may include receiving a command to initiate a voice recognition sequence 900. The command to initiate a voice recognition sequence 900 may include detecting a user input to initiate the voice recognition sequence 900, such as by recognizing a spoken initiation keyword (such as "window"), recognizing an eye tracking command, detecting a button or touchscreen press, or the like.

Once the voice recognition sequence 900 has been initiated, the voice recognition sequence 900 may include recognizing a display format keyword (such as "window"), which indicates that the voice recognition sequence is for selecting a display format.

In some embodiments, the voice recognition sequence 900 includes recognizing a display target keyword (such as, if there are three displays, "left", "center", or "right"), which indicates the particular display to target for the display format selection. Further, in some embodiments, the voice recognition sequence 900 may include recognizing a non-spoken display target command (e.g., recognizing, via an eye tracking system 116, the particular display to target for the display format selection based on where a pilot is looking (e.g., a pilot's gaze); recognizing, via a physical input device, the particular display to target for the display format selection based on recognition of a physical input from a user that indicates the display to target for the display format selection; or the like), which indicates the particular display to target for the display format selection. In such embodiments where the voice recognition sequence 900 includes recognizing, via an eye tracking system 116, the particular display to target for the display format selection based on where a pilot is looking (e.g., a pilot's gaze), the voice recognition sequence 900 may include recognizing an eye tracking initiation keyword (such as "eye" or the like) configured to initiate eye tracking, by the eye tracking system 116, to detect the particular target display being viewed by the pilot. Further, in some embodiments, where the eye tracking system contributes to selecting a display target, a computing device is configured to output (e.g., overlay on the GUI of a display) on the display a current location detected by the eye tracking system 116 of a pilot's gaze so that the pilot may compensate for any offset between the eye tracking system's 116 detected gaze location and the pilot's actual focus point and/or so that the pilot may confirm the eye tracking system's 116 detected gaze location.

In some embodiments, the voice recognition sequence 900 includes recognizing a size keyword (such as "half", "full", "quarter", or the like), which indicates the size to make a particular window on a targeted display. In some embodiments, the voice recognition sequence 900 includes recognizing a content keyword (such as "FMS", "map", "chart", "checklist", "system", or the like), which indicates the content to display on the targeted window and/or targeted display. In some embodiments, the voice recognition sequence 900 may include recognizing one or more keywords (e.g., a display target keyword, size keyword, content keyword, or the like) in any order.

In some embodiments, the voice recognition system 115 or a computing device determines whether a valid voice recognition sequence 900 for selecting a display format has been received. If the voice recognition system 115 or a computing device determines that a valid voice recognition sequence 900 for selecting a display format has been received, the voice recognition system 115 or a computing device may output a signal which causes an indicator to indicate (e.g., audibly, such as by a beep, or the like), visually such as by illuminating a light emitting diode as a particular color, presenting a valid symbol on a text buffer (e.g., 601, 701, or 802) or display, or the like) to a user that a valid voice recognition sequence for selecting a display format has been received. If the voice recognition system 115 or a computing device determines that an invalid voice recognition sequence 900 has been received, the voice recognition system 115 or a computing device may output a signal which causes an indicator to indicate (e.g., audibly, such as by a particular beep, or the like, visually such as by illuminating a light emitting diode as a particular color, presenting an invalid symbol on a text buffer (e.g., 601, 701, or 802) or display, presenting an invalid or error message, or the like) to a user that an invalid voice recognition sequence has been received. For example, a nonsensical command (such as "window full system") may be ignored and result in outputting an error message on the text buffer (e.g., 601, 701, or 802).

Additionally, in some embodiments, the voice recognition sequence 900 may include receiving a command to conclude the voice recognition sequence 900. The command to conclude the voice recognition sequence 900 may include detecting a user input to conclude the voice recognition sequence 900, such as by recognizing a spoken conclusion keyword (e.g., "enter"), recognizing an eye tracking command, detecting a button or touchscreen press, or the like.

In response to receiving a valid voice recognition sequence for selecting a display format, the voice recognition system 115, a computing device, a processor executing instructions of display window manager software, or the like performs one or more operations to output GUI data, which corresponds to the display format as selected by the user, to the displays. As such, a user may select a display format by performing a simple voice command which is recognized by the voice recognition system 115.

Exemplary voice recognition sequences 900 for selecting a display format may include "window FMS", "window left chart", "window map half center", or the like. In some embodiments, a voice recognition sequence 900 of "window FMS" may cause a default sized FMS window to be placed in an onside default target location. In some embodiments, a voice recognition sequence 900 of "window left chart" may cause a default sized chart to be placed on a left display. In some embodiments, a voice recognition sequence 900 of "window map half center" may cause a half sized map to be placed on a center display.

Figure 10A:
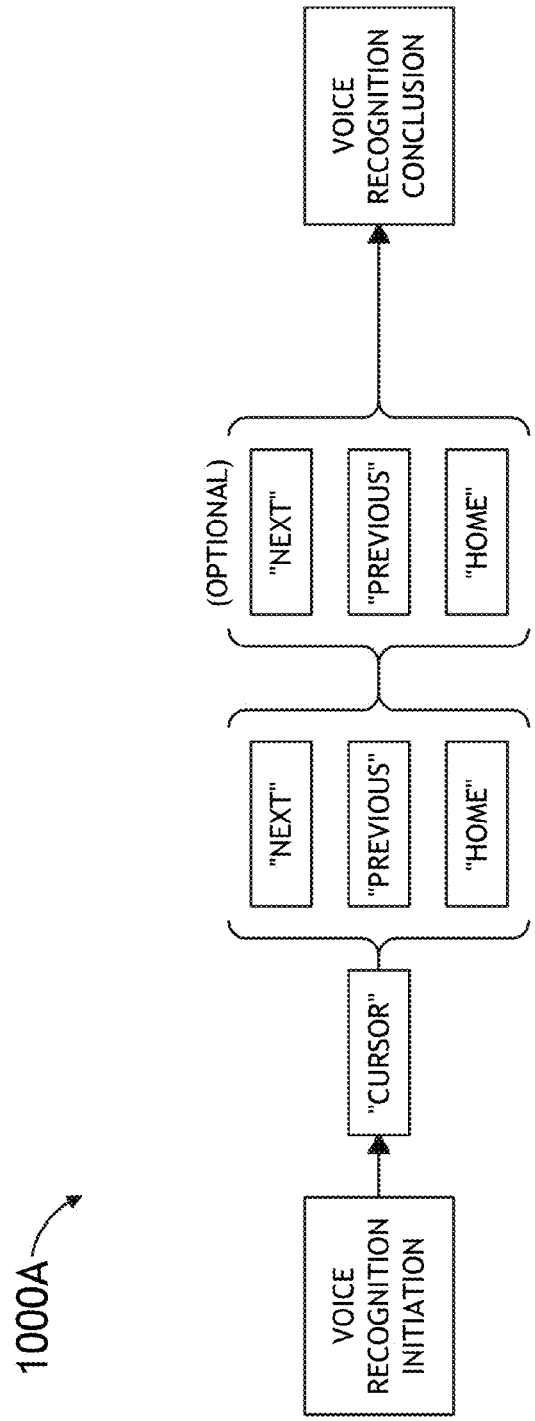
FIGS. 10A-B depict exemplary flow diagrams of exemplary voice recognition sequences for performing cursor control operations of some embodiments.

Referring now to FIG. 10A, an exemplary flow diagram of an exemplary voice recognition sequence 1000A for performing a cursor control operation (such as manipulating a cursor, tabbing, selecting selectable objects (e.g., icons, fields, tabs, or the like) or the like) on a GUI of one or more selected aircraft displays. The voice recognition sequence 1000A for performing a cursor control operation may reduce the pilot's time spent performing head-down tasks as would typically be required by interfacing with a cursor control device. Additionally, in some embodiments, the voice recognition sequence 1000A is configured to be received and handled by existing software of an integrated display system, which is currently configured to receive inputs of a cursor control device for performing cursor control operations. Some embodiments of the invention may include configuring the software of the integrated display system to receive and handle the voice recognition sequence 1000A for performing the cursor control operation. Further, in some embodiments, performing the cursor control operation may include a pilot using a combination of a voice recognition sequence 1000A and physical inputs.

As shown in FIG. 10A, an exemplary voice recognition sequence 1000A may include receiving a command to initiate a voice recognition sequence 1000A. The command to initiate a voice recognition sequence 1000A may include detecting a user input to initiate the voice recognition sequence 1000A, such as by recognizing a spoken initiation keyword (such as "cursor"), recognizing an eye tracking command, detecting a button or touchscreen press, or the like.

Once the voice recognition sequence 1000A has been initiated, the voice recognition sequence 1000A may include recognizing a cursor control keyword (such as "cursor", "tab", or the like), which indicates that the voice recognition sequence is for performing a cursor control operation on the location of the cursor.

In some embodiments, the voice recognition sequence 1000A includes recognizing a move keyword (such as "next", "previous", or "home"), which indicates where to move the cursor (e.g., to a next selectable object (e.g., a tab, icon, field, or the like), a previous selectable object (e.g., a tab, icon, field, or the like), to a default home selectable object (e.g., a tab, icon, field, or the like), or the like). In some embodiments, the voice recognition sequence 1000A includes recognizing one or more subsequent move keywords (such as, "next", "previous", or "home"), which indicates where to additionally move the cursor (e.g., to move the cursor to a subsequent next selectable object, which is two or more selectable objects from the original location of the cursor; to move the cursor to a subsequent previous selectable object, which is two or more selectable objects from the original location of the cursor; to a default home selectable object; or the like).

Further, in some embodiments, the voice recognition sequence 1000A may include recognizing a move command (e.g. recognizing, via an eye tracking system 116, a cursor destination or selectable object based on where the pilot is looking (e.g., a pilot's gaze)), which indicates where to move the cursor (e.g., a cursor destination or selectable object (e.g., a tab, icon, field, or the like) identified by a user's gaze, or the like). In such embodiments where the voice recognition sequence 1000A includes recognizing, via an eye tracking system 116, a cursor destination or selectable object based on where the pilot is looking (e.g., a pilot's gaze), the voice recognition sequence 900 may include recognizing an eye tracking initiation keyword (such as "eye" or the like) configured to initiate eye tracking, by the eye tracking system 116, to detect the cursor destination or selectable object based on where the pilot is looking. Additionally, if after recognizing a cursor control keyword (such as "cursor", "tab", or the like), the voice recognition system 115 does not recognize a move keyword within a predetermined amount of time, the voice recognition sequence 1000A may include automatically initiating eye tracking, by the eye tracking system 116, to detect the cursor destination or selectable object based on where the pilot is looking. Further, in some embodiments, where the eye tracking system contributes to moving a cursor, a computing device is configured to output (e.g., overlay on the GUI of a display) on the display a current location detected by the eye tracking system 116 of a pilot's gaze so that the pilot may compensate for any offset between the eye tracking system's 116 detected gaze location and the pilot's actual focus point and/or so that the pilot may confirm the eye tracking system's 116 detected gaze location.

Additionally, in some embodiments, the voice recognition sequence 1000A may include receiving a command to conclude the voice recognition sequence 1000A. The command to conclude the voice recognition sequence 1000A may include detecting a user input to conclude the voice recognition sequence 1000A, such as by recognizing a spoken conclusion keyword (such as "enter", "end", or the like), recognizing an eye tracking command, detecting a button or touchscreen press, or the like.

In response to receiving a voice recognition sequence 1000A for performing a cursor control operation, the voice recognition system 115, a computing device, a processor of an integrated display system, or the like performs one or more operations to output GUI data, which corresponds to the cursor being positioned as a result of performance of the cursor control operation, to one or more displays. As such, a user may manipulate the position of a cursor or navigate selectable objects by performing a simple voice command which is recognized by the voice recognition system 115.

Exemplary voice recognition sequences 1000A for performing cursor control operations may include "cursor home", "cursor next next next", "cursor previous", or the like. In some embodiments, a voice recognition sequence 1000A of "cursor home" may cause a cursor to be placed at a default position. In some embodiments, a voice recognition sequence 1000A of "cursor next next next" may cause a cursor to be moved forward, in a predetermined selectable object (e.g., tab, icon, field, or the like) order, three selectable objects (e.g., tabs, icons, fields, or the like) from an original cursor position. In some embodiments, a voice recognition sequence 1000A of "cursor previous" may cause a cursor to be moved backward, in a predetermined selectable object (e.g., tab) order, one selectable object (e.g., tabs, icons, fields, or the like) from an original cursor position.

Additionally, in some embodiments, the voice recognition sequence 1000A may include recognizing, by the voice recognition sequence 115, an identify keyword to trigger at least one display to display an associated identifier (e.g., a speech identifier) for each selectable object displayed on the at least one display. Further, in some embodiments, recognition of the identify keyword may trigger some (e.g., a set of associated selectable objects) or all of the possible selectable objects of at least one display to be highlighted for easier viewing. Particular exemplary embodiments are configured to provide a meaningful speech name (e.g. a word associated with a particular selectable object, such as "COM") for each selectable object, text entry box, or the like. Other exemplary embodiments are configured to provide speech identifiers for each selectable object, text entry box, or the like that may be spoken as characters of the pilot phonetic alphabet, normal alphabet, numerals, or the like. For example, particular speech identifiers may include "Cursor COM1", "Cursor Identify Alpha", "Cursor Identify One", "Cursor Alpha Alpha", or the like.

Figure 10B:
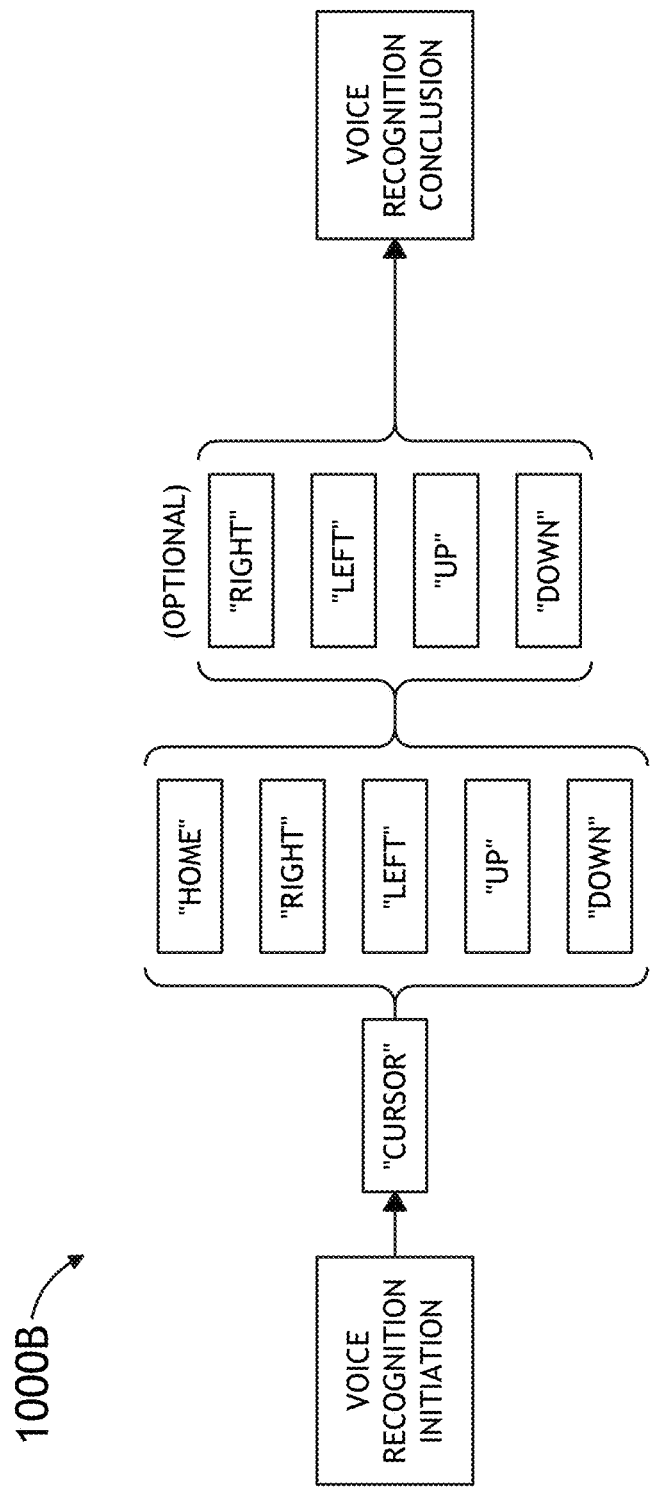

Referring now to FIG. 10B, an exemplary flow diagram of an exemplary voice recognition sequence 1000B for performing a raw cursor control operation (such as manipulating a directional movement of a cursor, or the like) on a GUI of one or more selected aircraft displays. The voice recognition sequence 1000B for performing a cursor control operation may reduce the pilot's time spent performing head-down tasks as would typically be required by interfacing with a cursor control device. Additionally, in some embodiments, the voice recognition sequence 1000B is configured to be received and handled by existing software of an integrated display system, which is currently configured to receive inputs of a cursor control device for performing raw cursor control operations. Some embodiments of the invention may include configuring a processor of the integrated display system to receive and handle the voice recognition sequence 1000B for performing the raw cursor control operation. Further, in some embodiments, performing the raw cursor control operation may include a pilot using a combination of a voice recognition sequence 1000B and physical inputs. Additionally, in some embodiments, performance of the raw cursor control may be used as a backup cursor control device rather than having a second physical cursor control device.

As shown in FIG. 10B, an exemplary voice recognition sequence 1000B may include receiving a command to initiate a voice recognition sequence 1000B. The command to initiate a voice recognition sequence 1000B may include detecting a user input to initiate the voice recognition sequence 1000B, such as by recognizing a spoken initiation keyword (such as "cursor"), recognizing an eye tracking command, detecting a button or touchscreen press, or the like.

Once the voice recognition sequence 1000B has been initiated, the voice recognition sequence 1000B may include recognizing a cursor control keyword (such as "cursor", or the like), which indicates that the voice recognition sequence is for performing a cursor control operation on the location of the cursor. In some embodiments, the voice recognition sequence 1000B includes recognizing a move keyword (such as, "home", "right", "left", "up", "down", or the like), which indicates to move the cursor in a specified direction by a predetermined increment or to move the cursor to a default position. In some embodiments, the voice recognition sequence 1000B includes recognizing one or more subsequent move keywords (such as "right", "left", "up", "down", or the like), which indicates which indicates to further move the cursor in a specified direction by a predetermined increment.

Additionally, in some embodiments, the voice recognition sequence 1000B may include receiving a command to conclude the voice recognition sequence 1000B. The command to conclude the voice recognition sequence 1000B may include detecting a user input to conclude the voice recognition sequence 1000B, such as by recognizing a spoken conclusion keyword (such as "enter", "end", or the like), recognizing an eye tracking command, detecting a button or touchscreen press, or the like.

In response to receiving a voice recognition sequence 1000B for performing a raw cursor control operation, the voice recognition system 115, a computing device, a processor of an integrated display system, or the like performs one or more operations to output GUI data, which corresponds to the cursor having been moved as a result of performance of the raw cursor control operation, to one or more displays. As such, a user may manipulate the position of a cursor by performing a simple voice command which is recognized by the voice recognition system 115.

Exemplary voice recognition sequences 1000B for performing raw cursor control operations may include "cursor home", "cursor left", "cursor right right", or the like. In some embodiments, a voice recognition sequence 1000B of "cursor home" may cause a cursor to be placed at a default position. In some embodiments, a voice recognition sequence 1000B of "cursor left" may cause a cursor to be moved to the left by one predetermined increment from the original cursor position. In some embodiments, a voice recognition sequence 1000B of "cursor right right" may cause a cursor to be moved to the right by two predetermined increments from the original cursor position.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the disclosed subject matter. The accompanying claims may present elements of the various steps in a sample order, and are not necessarily meant to be limited to the specific order or hierarchy presented.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
   recognizing, via an eye tracking system comprising an eye tracking system processor, a beginning eye tracking command to begin outputting text data received from a voice recognition system implemented in an aircraft to a text buffer on a display based on a current location of a pilot's gaze, wherein the text buffer is implemented as at least one of a portion of a cockpit display of the aircraft or a display implemented on a keypad of the aircraft;
   recognizing, via the voice recognition system, pilot speech as the text data;
   outputting, via the eye tracking system, the text data to the text buffer for graphical presentation to a pilot of the aircraft, wherein the text buffer is configured to temporarily display the text data as textual content to the pilot at least until a destination computing device is selected by the pilot;
   detecting, via the voice recognition system, an end command to end outputting the text data received from the voice recognition system to the text buffer;
   receiving a confirmation input from the pilot, the confirmation input indicating that the pilot has confirmed accuracy of the text data of the text buffer;
   receiving a destination selection from the pilot, the destination selection indicating the destination computing device selected by the pilot for the text data of the text buffer;
   outputting the text data of the text buffer to the destination computing device selected by the pilot, the destination computing device including a processor configured to utilize the text data to execute instructions of aircraft function software to perform one or more aircraft function operations, wherein the destination computing device selected by the pilot is a flight management system (FMS) implemented in the aircraft, a weather radar system implemented in the aircraft, an attitude and heading reference system (AHRS) implemented in the aircraft, or a traffic collision avoidance system (TCAS) implemented in the aircraft;
   utilizing, by the processor of the destination computing device, the text data to execute the instructions of the aircraft function software to perform the one or more aircraft function operations; and
   performing a cursor control operation on a graphical user interface (GUI) of at least one cockpit display of the aircraft, wherein performing the cursor control operation comprises:
     recognizing, via the voice recognition system, a cursor control keyword configured to indicate that a voice recognition sequence is for performing the cursor control operation to move a cursor from a current position to a new position;
     recognizing, via the voice recognition system, at least two move keywords configured to indicate where to move the cursor; and
     performing one or more cursor control operations to move the cursor of the GUI from the current position to a second position based at least on the at least two move keywords.

2. The method of claim 1, further comprising:
   recognizing, via the voice recognition system, one or more control keywords;
   upon recognizing the one or more control keywords, recognizing pilot speech as a portion of contents of the text buffer to be edited; and
   editing the portion of the contents of the text buffer.

3. The method of claim 1, further comprising:
   detecting a copy command to perform a copy operation;
   recognizing a paste destination for the copy operation; and
   copying contents of the text buffer to the paste destination.

4. The method of claim 1, further comprising:
   detecting a paste command to perform a paste operation;
   recognizing a copy source for the paste operation; and
   receiving text data of the copy source to be presented in the text buffer.

5. The method of claim 1, wherein the text buffer comprises the display implemented on the keypad of the aircraft.

6. The method of claim 1, further comprising:
performing operations for selecting a cockpit display format of a graphical user interface (GUI) of at least one cockpit display of the aircraft, wherein the operations include:
- recognizing, via the voice recognition system, a cockpit display format keyword configured to indicate that a voice recognition sequence is for selecting the cockpit display format;
- recognizing, via the voice recognition system, a content keyword configured to indicate content to display;
- receiving a command to conclude a voice recognition sequence for selecting the cockpit display format; and
- performing one or more cockpit display format operations to generate and output GUI data to the at least one cockpit display, wherein the GUI data is generated based at least on the content to display, wherein the content to display includes at least one of flight management system (FMS) content, map content, or flight checklist content.

7. A method for selecting a cockpit display format of a graphical user interface (GUI) of at least two cockpit displays of an aircraft, comprising:
- receiving a command to initiate a voice recognition sequence;
- recognizing, via a voice recognition system implemented in an aircraft, a cockpit display format keyword configured to indicate that the voice recognition sequence is for selecting the cockpit display format of a GUI of at least two cockpit displays of the aircraft;
- recognizing a targeted cockpit display of the at least two cockpit displays for the cockpit display format, wherein recognizing the targeted cockpit display of the at least two cockpit displays for the cockpit display format further comprises:
  - recognizing, via the voice recognition system, a cockpit display target keyword configured to indicate the targeted cockpit display of the at least two cockpit displays for the cockpit display format; and
  - recognizing, via an eye tracking system, an eye tracking cockpit display target command configured to indicate the targeted cockpit display of the at least two cockpit displays for the display format;
- recognizing, via the voice recognition system, a size keyword configured to indicate a size to make a window to display on the targeted cockpit display;
- recognizing, via the voice recognition system, a content keyword configured to indicate content to display in the window on the targeted cockpit display;
- performing a cursor control operation on the GUI, wherein performing the cursor control operation comprises:
  - recognizing, via the voice recognition system, a cursor control keyword configured to indicate that a voice recognition sequence is for performing the cursor control operation to move a cursor from a current position to a new position;
  - recognizing, via the voice recognition system, at least one move keyword configured to indicate where to move the cursor; and
  - performing one or more cursor control operations to move the cursor of the GUI from the current position to a second position based at least on the at least one move keyword;
- receiving a command to conclude the voice recognition sequence for selecting the cockpit display format; and
- performing one or more cockpit display format operations to generate and output GUI data to the targeted cockpit display of the at least two cockpit displays of the aircraft, wherein the GUI data is generated based at least on the content to display, the size to make the window, and the targeted cockpit display, wherein the content to display includes at least one of map content or flight checklist content.

8. The method of claim 1, wherein recognizing, via the voice recognition system, the at least two move keywords configured to indicate where to move the cursor relative to the current position of the cursor further comprises:
- recognizing, via the voice recognition system, the at least two move keywords configured to indicate to move the cursor relative to the current position of the cursor in a specified direction by a predetermined increment.

9. The method of claim 1, wherein recognizing, via the voice recognition system, the at least two move keywords configured to indicate where to move the cursor relative to the current position of the cursor further comprises:
- recognizing, via the voice recognition system, the at least two move keywords configured to indicate to move the cursor relative to the current position of the cursor from the current position to a second position corresponding to a selectable object.

10. The method of claim 1, further comprising:
performing operations for selecting a cockpit display format of a graphical user interface (GUI) of at least two cockpit displays of the aircraft, wherein the operations include:
- recognizing, via a voice recognition system comprising a processor, a cockpit display format keyword configured to indicate that the voice recognition sequence is for selecting the cockpit display format of a GUI of at least two cockpit displays of an aircraft, wherein the voice recognition system is implemented in the aircraft;
- recognizing a targeted cockpit display of the at least two cockpit displays for the cockpit display format;
- recognizing, via the voice recognition system, a size keyword configured to indicate a size to make a window to display on the targeted cockpit display;
- recognizing, via the voice recognition system, a content keyword configured to indicate content to display in the window on the targeted cockpit display;
- receiving a command to conclude the voice recognition sequence for selecting the cockpit display format; and
- performing one or more cockpit display format operations to generate and output GUI data to the targeted cockpit display of the at least two cockpit displays of the aircraft, wherein the GUI data is generated based at least on the content to display, the size to make the window, and the targeted cockpit display.

11. The method of claim 1, wherein the destination computing device including the processor is configured to utilize the text data to execute aircraft function software to perform one or more aircraft function operations and then output data to memory to be used by the processor for executing instructions of another aircraft function software.

12. The method of claim 1, wherein the destination computing device selected by the pilot is the weather radar system implemented in the aircraft, the attitude and heading reference system (AHRS) implemented in the aircraft, or the traffic collision avoidance system (TCAS) implemented in the aircraft.

* * * * *